(12) United States Patent
Furuichi et al.

(10) Patent No.: US 10,969,235 B2
(45) Date of Patent: Apr. 6, 2021

(54) SECURE DATA NAVIGATION

(71) Applicant: International Business Machines Corporation, Armonk, NY (US)

(72) Inventors: Sanehiro Furuichi, Tokyo (JP); Yasutaka Nishimura, Kanagawa-ken (JP); Kenichi Takasaki, Tokyo (JP); Shoichiro Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/190,286

(22) Filed: Nov. 14, 2018

(65) Prior Publication Data

US 2020/0149908 A1    May 14, 2020

(51) Int. Cl.
| | |
|---|---|
| *G01C 21/34* | (2006.01) |
| *G06F 21/62* | (2013.01) |
| *G01C 21/20* | (2006.01) |
| *G01C 21/36* | (2006.01) |
| *G06F 16/29* | (2019.01) |
| *G06F 16/9537* | (2019.01) |

(52) U.S. Cl.
CPC ......... *G01C 21/3484* (2013.01); *G01C 21/20* (2013.01); *G01C 21/3476* (2013.01); *G01C 21/3691* (2013.01); *G06F 16/29* (2019.01); *G06F 16/9537* (2019.01); *G06F 21/6218* (2013.01)

(58) Field of Classification Search
CPC .. G06F 16/29; G06F 16/9537; G06F 21/6218; G01C 21/20; G01C 21/3476; G01C 21/3484; G01C 21/3691
See application file for complete search history.

(56) References Cited

U.S. PATENT DOCUMENTS

| | | |
|---|---|---|
| 9,689,702 B2 | 6/2017 | Habib et al. |
| 9,970,773 B2 | 5/2018 | Russlies |
| 10,036,648 B1 | 7/2018 | Hobbs et al. |
| 10,645,179 B2 | 5/2020 | Chen et al. |
| 2014/0343841 A1 | 11/2014 | Faaborg et al. |
| 2017/0307396 A1* | 10/2017 | So ...................... G01C 21/3484 |
| 2018/0003516 A1 | 1/2018 | Khasis |
| 2019/0323854 A1* | 10/2019 | Tamai ..................... G06F 16/29 |

* cited by examiner

*Primary Examiner* — Anne Marie Antonucci
*Assistant Examiner* — Sahar Motazedi
(74) *Attorney, Agent, or Firm* — L. Jeffrey Kelly

(57) ABSTRACT

The method, computer program product and computer system may include computing device which may determine a destination route. The computing device may receive current travel data associated with a primary user on the destination route and determine past travel data associated with a primary user on the destination route. The computing device may calculate, in response to determining that past travel data associated with a primary user on the destination route exists, a reliability degree of the current travel data associated with a primary user on the destination route based on the past travel data associated with a primary user on the destination route. The computing device may transmit a signal to a user device, the signal providing an instruction to display features according to an abstraction level of points of interest on the destination route based on the reliability degree.

20 Claims, 8 Drawing Sheets

SECURE DATA NAVIGATION

BACKGROUND

The present invention relates generally to a method, system, and computer program for secure data navigation. More particularly, the present invention relates to a method, system, and computer program for preventing the theft of map data.

Navigation systems have become a near ubiquitous technology used on a variety of devices such as smartphones, cars, and as stand-alone devices. Many navigation systems rely on or utilize the Global Positioning System (GPS). GPS devices allow users to orient themselves and to plan out travel routes. GPS is a satellite-based radio navigation system that provides geolocation and time information to a GPS receiver anywhere on or near the Earth where there is an unobstructed line of sight to GPS satellites. GPS does not require a user to transmit any data, and it operates independently of any telephonic or internet reception, though these technologies can enhance the usefulness of the GPS positioning information. The GPS provides critical positioning capabilities to military, civil, and commercial users around the world. In addition to GPS, there are other navigation systems with similar capabilities such as the Russian Global Navigation Satellite System (GLONASS), China's BeiDou Navigation Satellite System, the European Union's Galileo positioning system, India's NAVIC, and Japan's Quasi-Zenith Satellite System.

BRIEF SUMMARY

An embodiment of the invention may include a method, computer program product and computer system for secure data navigation. The method, computer program product and computer system may include computing device which may determine a destination route. The computing device may receive current travel data associated with a primary user on the destination route and determine past travel data associated with a primary user on the destination route. The computing device may calculate, in response to determining that past travel data associated with a primary user on the destination route exists, a reliability degree of the current travel data associated with a primary user on the destination route based on the past travel data associated with a primary user on the destination route. The computing device may transmit a signal to a user device, the signal providing an instruction to display features according to an abstraction level of points of interest on the destination route based on the reliability degree.

BRIEF DESCRIPTION OF THE DRAWINGS

FIG. 1b illustrates example operating modules of the secure data navigation program of FIG. 1a;

DETAILED DESCRIPTION

Figure 1A:
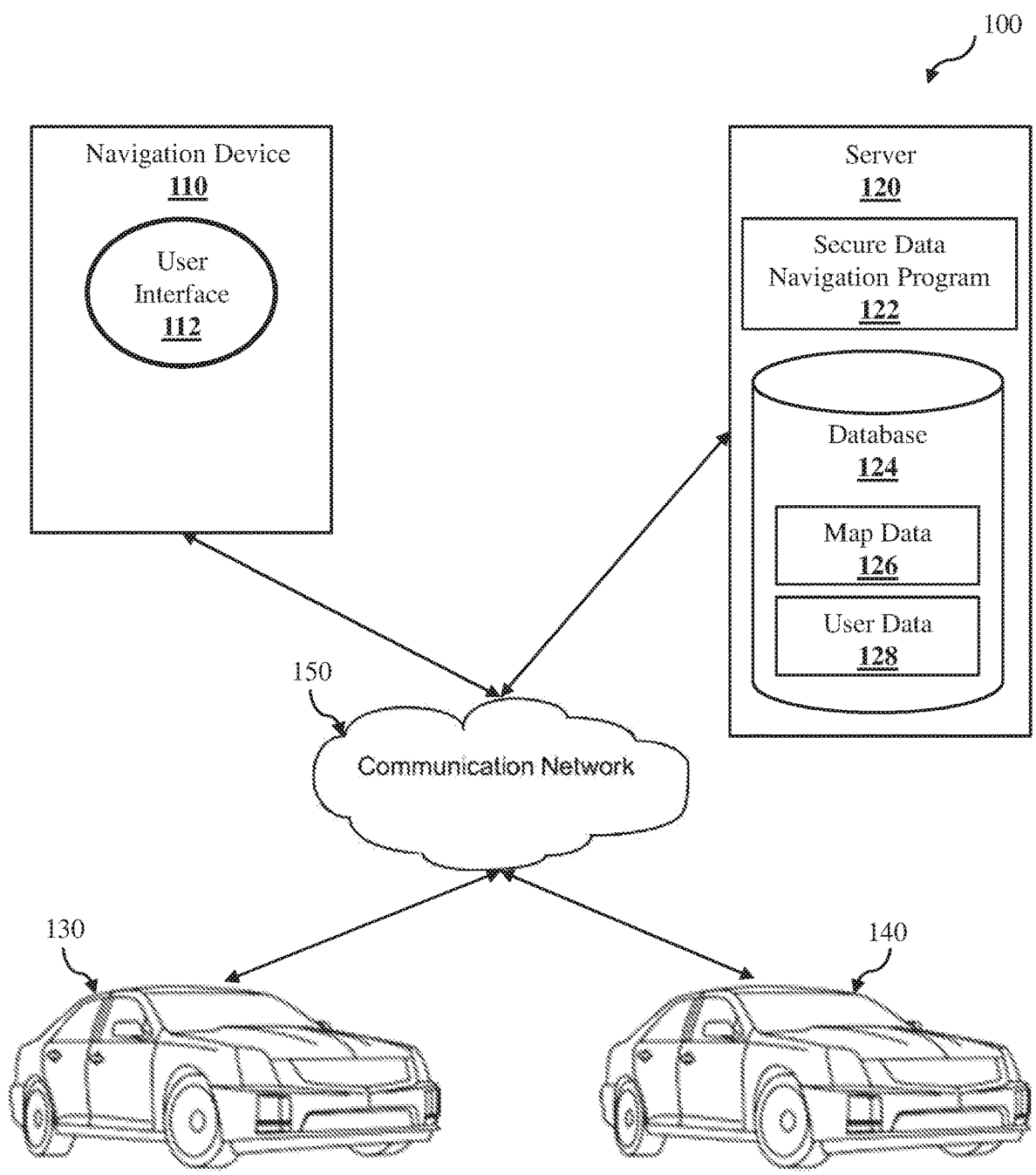
FIG. 1a illustrates a system for secure data navigation, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for preventing the theft of map data. More specifically, the present invention relates to preventing the theft of map data based on a user's location and the reliability associated with that user's location. Maps such as, but not limited, navigation device maps, and commercial GPS maps, contain data relating to routes and "points of interest" (POIs) along those routes, such as gas stations, restaurants, hotels, and landmarks, etc. The term POI may refer to any location. The term POI, as used in this specification and the claims, does not require that a particular location be "interesting" to anyone. For example, a landfill or a waste treatment plant may be a POI. The data contained in maps belongs to the map creator, vendor, and/or owner who went through great effort to collect all the data. For example, navigation map companies send out cars equipped with sophisticated cameras to collect images of routes and POIs along those routes. Further, navigation map companies collect crowd-sourced data regarding POIs. Current technology may not allow for the protection of the data collected by companies. For example, anyone can open up Google® Maps and see all the POI data that has been collected by Google®. Embodiments of the present invention provide a means for preventing the theft of map data by abstracting the map data and granting access to the map data based on a user's location. Further, embodiments of the present invention determine the reliability of a user's location and grant access to certain abstraction levels based on the reliability determined location of a user.

Reference will now be made in detail to the embodiments of the present invention, examples of which are illustrated in the accompanying drawings, wherein like reference numerals refer to like elements throughout. Embodiments of the invention are generally directed to a system for preventing the theft of map data.

FIG. 1 illustrates a secure data navigation system 100, in accordance with an embodiment of the invention. In an example embodiment, secure data navigation system 100 includes a navigation device 110, a server 120, primary vehicle 130, and secondary vehicle 140, interconnected via network 150.

In the example embodiment, the network 150 is the Internet, representing a worldwide collection of networks and gateways to support communications between devices connected to the Internet. The network 150 may include, for example, wired, wireless or fiber optic connections. In other embodiments, the network 150 may be implemented as an intranet, a local area network (LAN), or a wide area network (WAN). In general, the network 150 can be any combination of connections and protocols that will support communications between the navigation device 110, the server 120, the primary vehicle 130, and the secondary vehicle 140.

The navigation device 110 may include a user interface 112. In the example embodiment, the navigation device 110 may be a global positioning system (GPS) device, or any other navigational device or computing system capable of storing, compiling, and organizing audio, visual, or textual content and receiving and sending that content to and from other computing devices, such as the server 120, the primary vehicle 130, and the secondary vehicle 140 via the network 150. In some embodiments, the navigation device 110 includes a collection of devices or data sources. In one embodiment, the navigation device 110 may be a stand-alone navigation device such as, but not limited to, a cellphone, a smart watch, or any other portable navigation device. In another embodiment of the invention the navigation device 110 may be hardwired into the primary vehicle 130 and/or the secondary vehicle 140 which communicates with the primary vehicle 130 and/or the secondary vehicle 140 via the network 150. In yet another embodiment of the invention, the navigation device 110 may be a separate device which communicates with the primary vehicle 130 and/or the secondary vehicle 140 via the network 150. While only a single navigation device 110 is illustrated, it can be appreciated that one or more navigation devices may be a part of the secure data navigation system 100. The navigation device 110 is described in more detail with reference to FIG. 4.

The user interface 112 includes components used to receive input from a user on the navigation device 110 and transmit the input to the secure data navigation program 122 residing on the server 120, or conversely to receive information from the secure data navigation program 122 and display the information to the user on the navigation device 110. In an example embodiment, the user interface 112 uses a combination of technologies and devices, such as device drivers, to provide a platform to enable users of the navigation device 110 to interact with the secure data navigation program 122. In the example embodiment, the user interface 112 receives input, such as but not limited to, textual, visual, or audio input received from a physical input device, such as but not limited to, a keypad, mouse, and/or a microphone.

The server 120 includes secure data navigation program 122 and database 124. In the example embodiment, the server 120 may be a desktop computer, a notebook, a laptop computer, a tablet computer, a thin client, or any other electronic device or computing system capable of storing compiling and organizing audio, visual, or textual content and receiving and sending that content to and from other computing devices, such as the navigation device 110, the primary vehicle 130, and the secondary vehicle 140, via network 150. In an example embodiment, the server 120 may be resident in the navigation device 110. In yet another embodiment, the server 120 may be separate from the navigation device 110 and may reside at a third-party location communicating with the navigation device 110 via the network 150. The server 120 is described in more detail with reference to FIG. 4.

The database 124 may store the map data 126 and the user data 128. The map data 126 and the user data 128 may be any data, such as, but not limited to, audio, visual, or textual data. The map data 126 and the user data 128 may be associated with or obtained via the secure data navigation program 122, the navigation device 110, the primary vehicle 130, and/or the secondary vehicle 140. The map data 126 may include, but is not limited to, route data, points of interest (POI) data, weather data, traffic data, etc. Further, the POI data may include, but is not limited to, location of POIs, e.g. longitude and latitude, names of POIs, categories of POIs, e.g. coffee shops, restaurants, hotels, etc., photographs of POIs, entry points of POIs, etc. The user data 128 may include, but is not limited to, user profile data, user preference data, user location data, and historical user data, etc. User profile data may include, but it not limited to, a user's preferred POIs, a user's favorite destinations, a user's driving preferences, e.g. highways vs. rural routes, etc. The user data 128 may be received by the secure data navigation program 122 via the user interface 112 on the navigation device 110. The user data 128 may be associated with one or more users of the secure data navigation program 122. In one embodiment of the invention, the user data 128 may be associated with the primary vehicle 130 and/or the secondary vehicle 140. The database 124 is described in more detail above and with reference to FIG. 4.

The secure data navigation program 122 is a program capable of preventing the theft of the map data 126 from the secure data navigation system 100 by restricting access to the map data 126 based on the user data 128 associated with a primary user. For example, the secure data navigation program 122 may abstract the map data 126 into one or more abstraction levels and grant access to the one or more abstraction levels based on the user data 128. The secure data navigation program 122 may grant access to more and more descriptive abstraction levels of the map data 126 based on the location of the primary user. Further, the secure data navigation program 122 may use the user data 128 of secondary users to restrict access to the map data 126. For example, the secure data navigation program 122 may use the user data 128 of secondary users to calculate a reliability degree of the user data 128 of the primary user. The functions of the secure data navigation program 122 are described in more detail below with reference to FIG. 1b.

The primary vehicle 130 and the secondary vehicle 140 may be any vehicle including, but not limited to, a passenger car, a motorcycle, a commercial vehicle, a boat or any other vehicle capable of communicating with the navigation device 110 via the network 150. In one embodiment of the invention the primary vehicle 130 is associated with a primary user and the secondary vehicle 140 is associated with a secondary user. While only a single secondary vehicle 140 is illustrated, it can be appreciated that one or more secondary vehicles may be a part of the secure data navigation system 100.

Figure 1B:
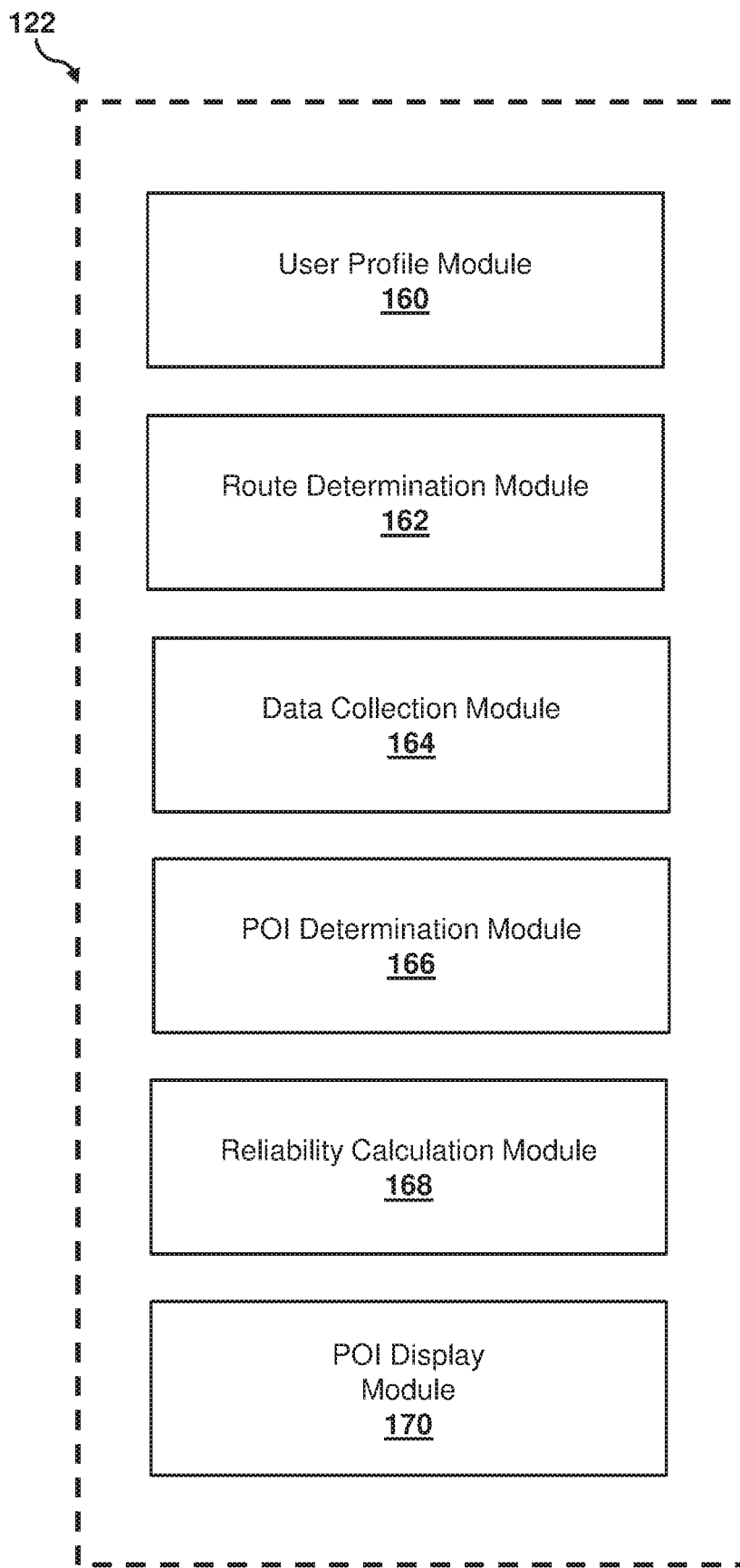

FIG. 1b illustrates example modules of the secure data navigation program 122. In an example embodiment, the secure data navigation program 122 may include six modules: user profile module 160, route determination module 162, data collection module 164, POI determination module 166, reliability calculation module 168, and POI display module 170.

The user profile module 160 receives preferences from a primary user using the navigation device 110. A user may enter his/her preferences, i.e. user preference data, using the user interface 112 on the navigation device 110 which may be saved in the user data 128 stored on the database 124. For example, a user may enter his/her preferences such as, but not limited to, favorite and/or frequent destinations (e.g. favorite gas stations, favorite restaurants, favorite coffee shops, favorite hotels, etc.), preferred road type, e.g. highway vs. rural roads, etc.

The route determination module 162 determines one or more routes to a destination utilizing the map data 126 stored on the database 124. The destination may be any location such as, but not limited to, an address, a place name, a restaurant, a gas station, a zip code, etc. The route determination module 162 may determine one or more routes to the destination routes based on the user data 128. For example, a primary user may enter a destination, such as, but not limited to Manchester, Vt., and the route determination module 162 may determine there are three possible routes from the primary user's current location. In another embodiment, the primary user may enter a destination into a search field on the user interface 112 and the route determination module 162 may determine there are three possible routes to the searched destination from the primary user's current location. In yet another embodiment of the invention, the primary user may select a destination from a list of favorite destinations saved in the user data 128 and route determination module 162 may determine there are three possible routes from the primary user's current location. The route determination module 162 may then present the routes to the primary user and the primary user may then select a route. The user may select a route using the user interface 112 on the navigation device 110. In another embodiment of the invention, the route determination module 162 may automatically select a route based on the user data 128. For example, the route determination module 162 may select a route which meets the primary user's preferences as described above in reference to the user profile module 160.

The data collection module 164 collects the user data 128 associated with the primary user and the map data 126 associated with the selected or determined route. For example, the data collection module 164 may collect the user data 128 associated with the selected or determined route such as, but not limited to, the historical travel data of the primary user, and the current location data of the primary user, etc. The data collection module 164 may also collect map data 126 associated with the selected or determined route such as, but not limited to, weather data, and traffic data, etc. Further, the data collection module 164 may collect the user data 128 of one or more secondary users associated with the selected or determined route. For example, the data collection module 164 may collect the user data 128 of one or more secondary users associated with the selected or determined route such as, but not limited to, the historical travel data of the one or more secondary users, and current location data of the one or more secondary users. In one embodiment of the invention, the data collection module 164 may only collect the user data 128 associated with the selected or determined route associated with one or more secondary users when there is no user data 128 associated with the primary user for the selected or determined route.

The points of interests (POI) determination module 166 determines the points of interest (POIs) along the selected and/or determined route based on the map data 126. POIs may include, but are not limited to, coffee shops, restaurants, gas stations, hotels, landmarks, etc. Further, the POI determination module 166 may create one or more abstraction levels of the map data 126 associated with the POI. The abstraction levels may include features such as, but not limited to, the category of the POI, the name of the POI, photographs of the POI, and the location of the POI, etc. Thus, certain features of one abstraction level may be, for example, but not limited to, obscured, blurred, and/or hidden in another abstraction level. Further, the certain abstraction levels may be further abstracted. For example, the location of a POI may be further abstracted such as, but not limited to, indicating location on map without exact location details, address of the POI, and distance to POI, etc. Access to the different abstraction levels of data may be granted based on the user data 128, which is described in more detail below with reference to the POI display module 170.

The reliability calculation module 168 calculates a reliability degree of the location of the primary user based on the map data 126 and the user data 128 associated with the selected or determined route. The reliability degree determines the appropriateness of the map data 126, being displayed to the primary user based on the user data 128, such as, but not limited to, the historical travel data of the primary user and or one or more secondary users associated with the selected or determined route and the map data 126, such as, but not limited to, weather data, and traffic data, associated with the selected or determined route. For example, if the selected or determined route is one of the primary user's favorite or frequented destinations as indicated in the user data 128, the reliability degree may be set to high value, e.g. 1.0. If the selected or determined route is one the primary user has never traveled before, the reliability degree may be set to a low value, e.g. 0. For a selected or determined route the primary user has never traveled before, the reliability calculation module 168 may increase the reliability score based the availability user data 128, one or more secondary users' data in the user data 128, and/or the map data 126. The reliability degree may be constantly updated as the user data 128 indicates the primary user is moving. The calculation of a reliability degree is described in more detail below with reference to FIG. 3.

The POI display module 170 displays the map data 126 associated with POIs on the selected or determined route based on the calculated reliability degree. The POI display module 170 may display different abstraction levels of the map data 126 associated with POIs on the selected or determined route based on the calculated reliability degree. If the calculated reliability degree exceeds a certain number, then the POI display module 170 may display more abstraction levels of the map data 126 associated with the POIs on the selected or determined route, i.e. more specific information about the POIs is displayed. If the calculated reliability degree is lower than a certain number, then the POI display module 170 may display less abstraction levels of the map data 126 associated with the POIs on the selected or determined route, i.e. less specific information about the POIs is displayed. For example, if a low reliability degree is calculated, i.e. the location of the primary user is not reliable, the POI display module 170 may only display generic abstraction levels associated with the POIs on the selected or determined route, such as, but not limited to, the category of the POI, e.g. coffee shop or restaurant. If a high reliability degree is calculated, i.e. the location of the primary user is reliable, the POI display module 170 may display specific abstraction levels associated with the POIs on the selected or determined route, such as, but not limited to, the name of the POI, e.g. Starbucks®, and the distance to the POI.

Figure 2A:
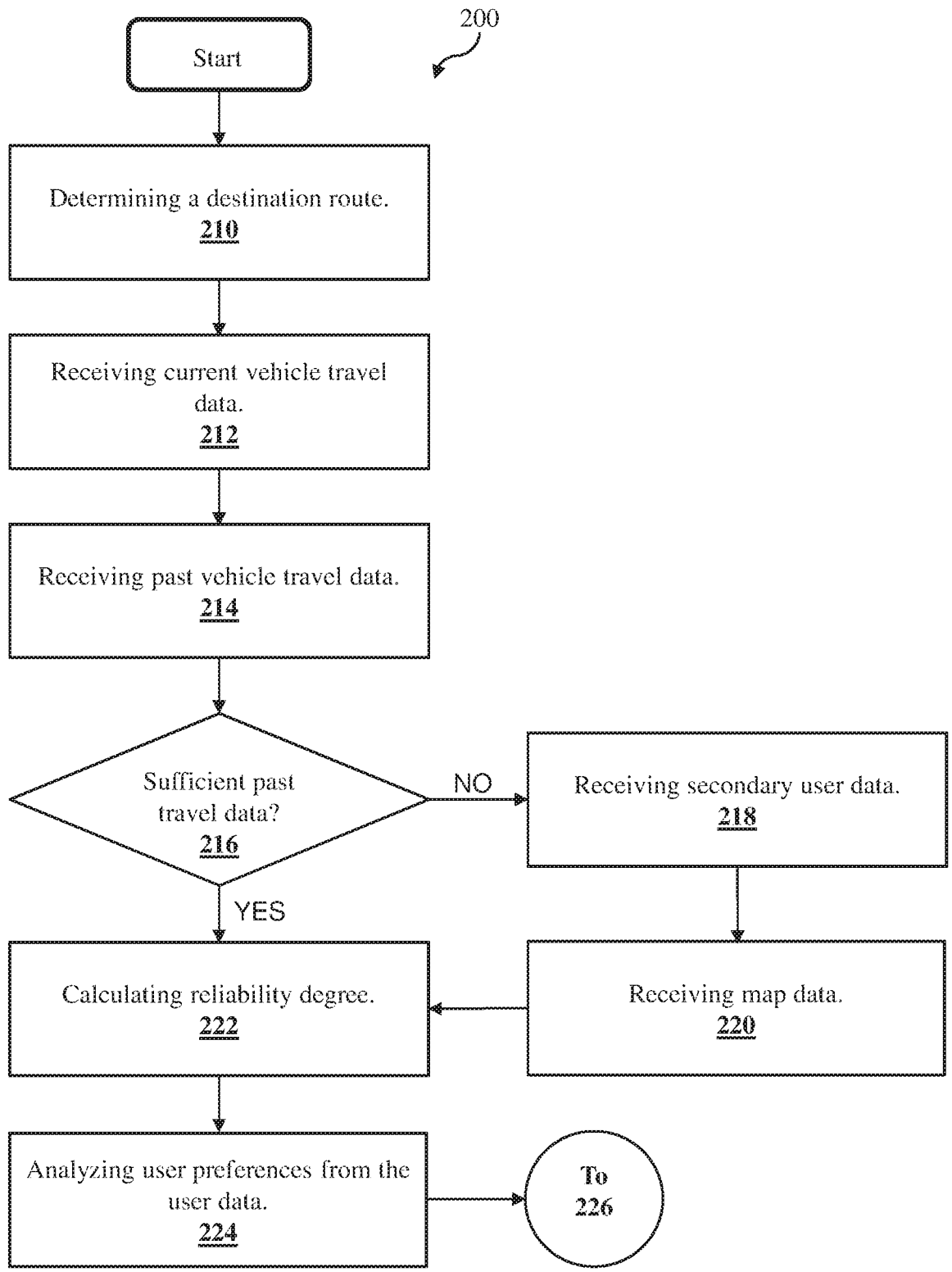
FIG. 2a is a flowchart illustrating an example method of the secure data navigation in accordance with an embodiment of the invention.
Figure 2B:
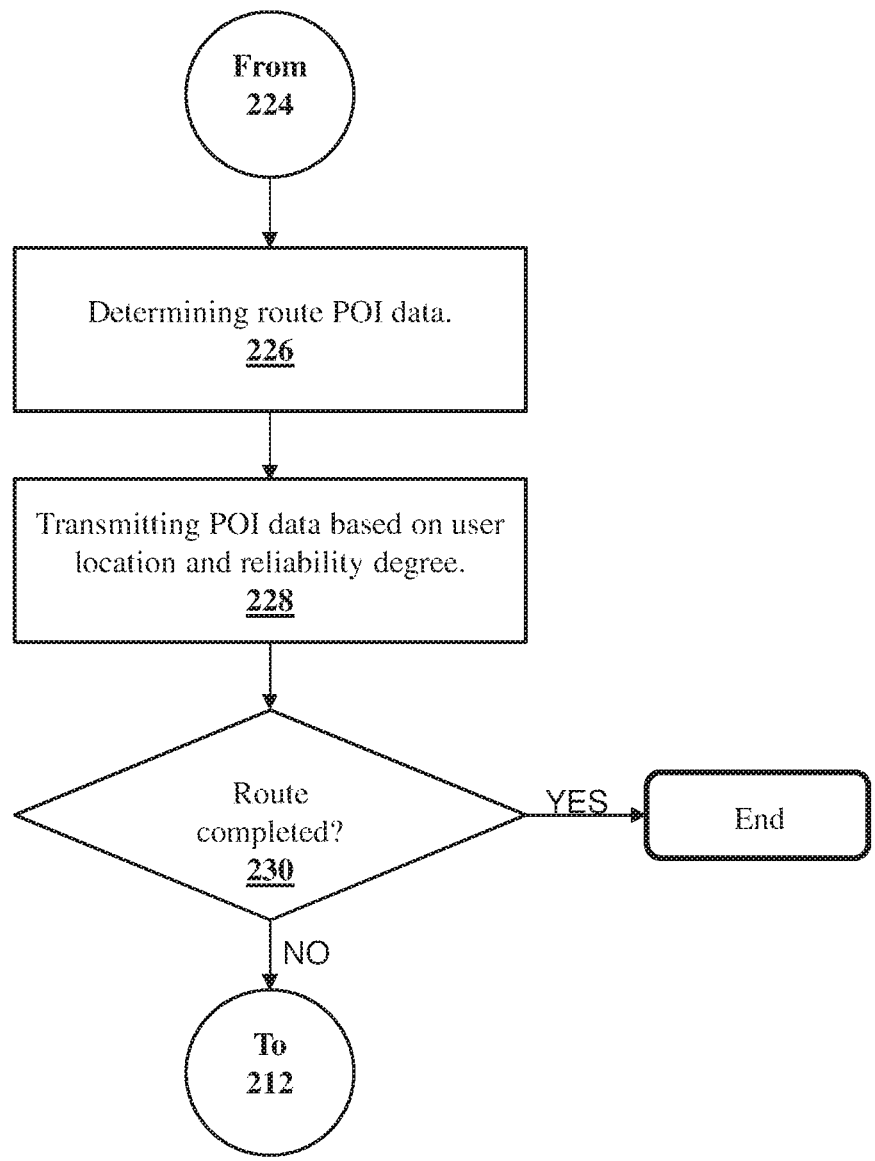
FIG. 2b is a flowchart illustrating an example method of the secure data navigation in accordance with an embodiment of the invention.

Referring to FIG. 2, a method 200 for secure data navigation is depicted, in accordance with an embodiment of the present invention.

Referring to operation 210, the route determination module 162 determines a destination. The destination may be determined via user input using the user interface 112 on the navigation device 110. Route determination is described in more detail above with reference to the user profile module 160 and the route determination module 162.

Referring to operation 212, the data collection module 164 receives the user data 128 associated with a primary user indicating the current travel data of the primary user. Data collection is described in more detail above with reference to the user data 128 and the data collection module 164.

Referring to operation 214, the data collection module 164 receives the user data 128 associated with a primary user indicating the historical travel data of the primary user for the determined route. Data collection is described in more detail above with reference to the user data 128 and the data collection module 164.

Referring to operation 216, the secure data navigation program 122 determines if sufficient user data 128 indicating the historical travel data of the primary user exists for the determined route. If the secure data navigation program 122 determines that there is insufficient historical travel data of the primary user for the determined route, the secure data navigation program 122 receives the user data 128 associated with one or more secondary users for the determined route at operation 218. The secure data navigation program 122 then proceeds to operation 220 and receives the map data 126 such as, but not limited to, weather data and traffic data associated with the determined route. Collection of the user data 128 associated with secondary users and the map data 126 associated with the determined route are described in more detail above with reference to the data collection module 164. If the secure data navigation program 122 determines that there is sufficient historical travel data of the primary user for the determined route, the secure data navigation program 122 proceeds to operation 222.

Referring to operation 222, the reliability calculation module 168 calculates a reliability degree of the primary user's location based on the map data 126 and the user data 128. Reliability degree calculation is described in more detail above with reference to the reliability calculation module 168 and below with reference to FIG. 3.

Referring to operation 224 the secure data navigation program 122 analyzes the user data 128 for the preferences of the primary user.

Referring to operation 226, the POI determination module 166 determines points of interest (POIs) on the determined route. POI determination is described in more detail above with reference to the POI determination module 166.

Referring to operation 228, the POI display module 170 transmits a signal to the navigation device 110 to display features according to an abstraction level of the POIs on the determined route based on the calculated reliability degree. POI display is described in more detail above with reference to the POI display module 170.

Referring to operation 230, the secure data navigation program 122 determines if the determined route is completed. If the secure data navigation program 122 determines that the route is not completed the secure data navigation program 122 proceeds to operation 212 and repeats operations 212-230 until the route is completed.

Figure 3:
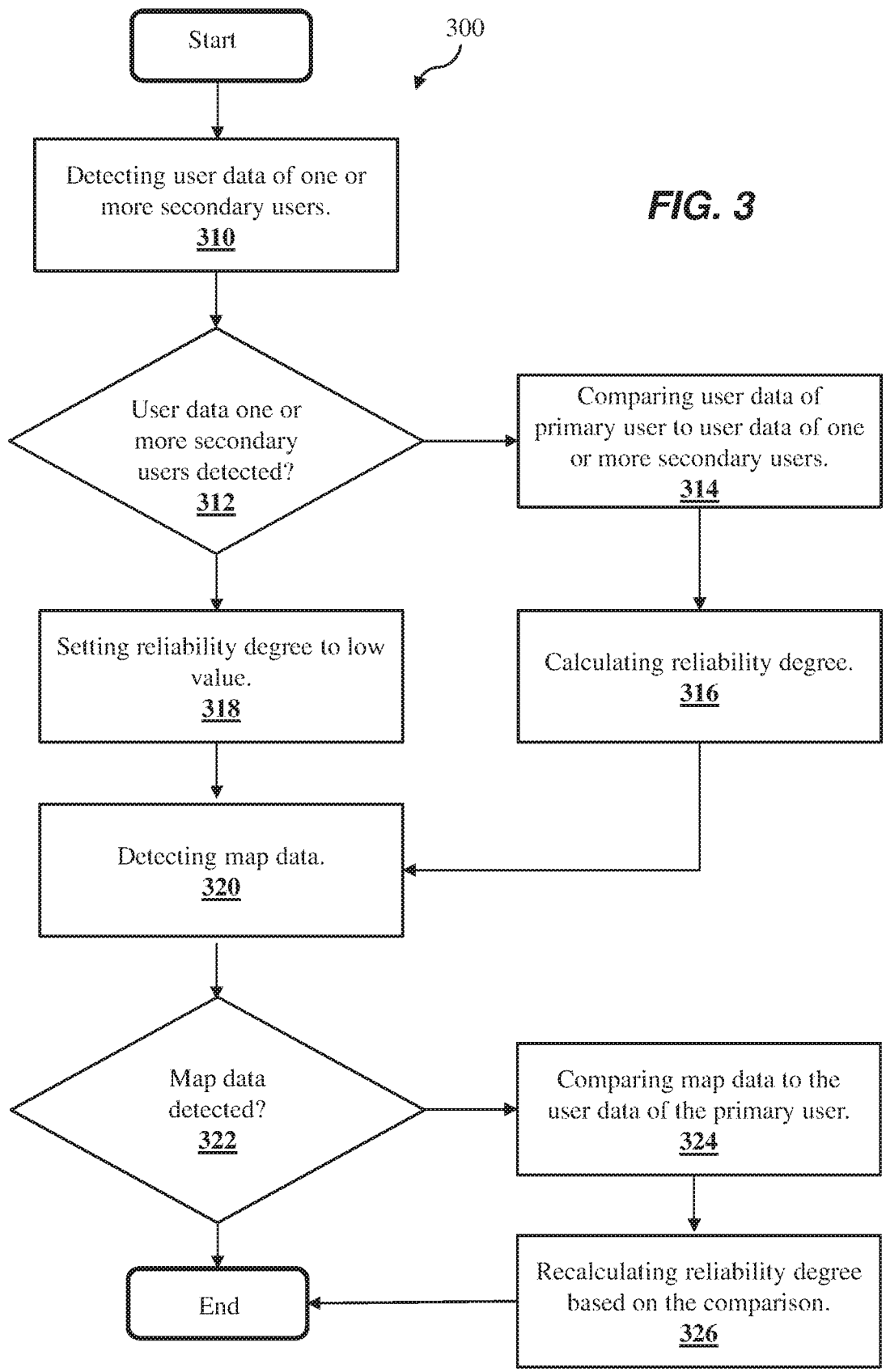
FIG. 3 is a flowchart illustrating an example method of the reliability degree calculation in the secure data navigation program, in accordance with an embodiment of the invention.

Referring to FIG. 3, a method 300 for reliability degree calculation in secure data navigation is depicted, in accordance with an embodiment of the present invention. FIG. 3 depicts a method for reliability degree calculation when the secure data program determines that there is insufficient historical travel data of the primary user for the determined route receives a user's route selection at operation 216.

Referring to operation 310, the secure data navigation program 122 detects the user data 128 of one or more secondary users for the selected or determined route.

Referring to operation 312, if the secure data navigation program 122 does not detect the any user data 128 of one or more secondary users for the selected or determined route, the secure data navigation program 122 sets the reliability degree to a low value at operation 318. If the secure data navigation program 122 does detect the user data 128 of one or more secondary users for the selected or determined route, the secure data navigation program 122 compares the user data 128 of the primary user and the user data 128 of the one or more secondary users at operation 314 and calculates a reliability degree at operation 316. For example, if the user data 128 of the primary user and the user data 128 of the one or more secondary users matches, the reliability degree would be set to a high value. Reliability degree calculation is described in more detail above with reference to the reliability calculation module 168.

Referring to operation 320, the secure data navigation program 122 detects the map data 126 associated with the selected or determined route.

Referring to operation 322, if the secure data navigation program 122 does detect the map data 126 associated with the selected or determined route, the secure data navigation program 122 compares the map data 126 of the selected or determined route to the user data 128 of the primary user at operation 324 and recalculates the reliability degree at operation 326. Reliability degree calculation is described in more detail above with reference to the reliability calculation module 168. If the secure data navigation program 122 does not detect the map data 126 associated with the selected or determined route, the secure data navigation program 122 ends the operation.

Figure 4:
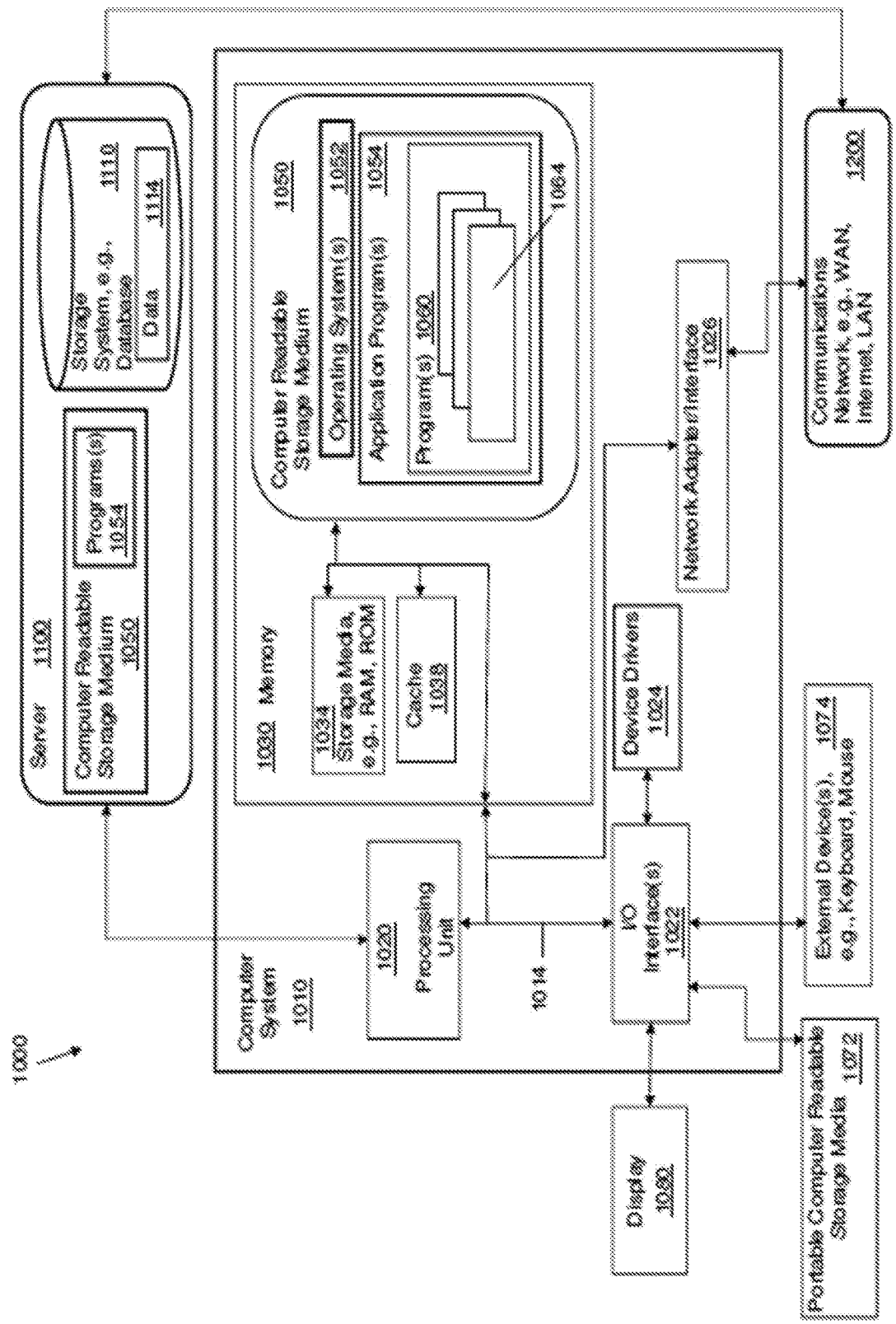
FIG. 4 is a block diagram depicting the hardware components of the secure data navigation system of FIG. 1, in accordance with an embodiment of the invention.

Referring to FIG. 4, a system 1000 includes a computer system or computer 1010 shown in the form of a generic computing device. The methods 200 and 300 for example, may be embodied in a program(s) 1060 (FIG. 4) embodied on a computer readable storage device, for example, generally referred to as memory 1030 and more specifically, computer readable storage medium 1050 as shown in FIG. 4. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 4 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 4 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 4, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention. As such, the computing device in FIG. 4 becomes specifically configured to implement mechanisms of the illustrative embodiments and specifically configured to perform the operations and generated the outputs of described herein for determining a route based on a user's preferred environmental experiences.

The methods 200 and 300 (FIGS. 2a, 2b, 3), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. For example, the program modules 1064 can include the modules 160-170 described above with reference to FIG. 1b. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood, that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
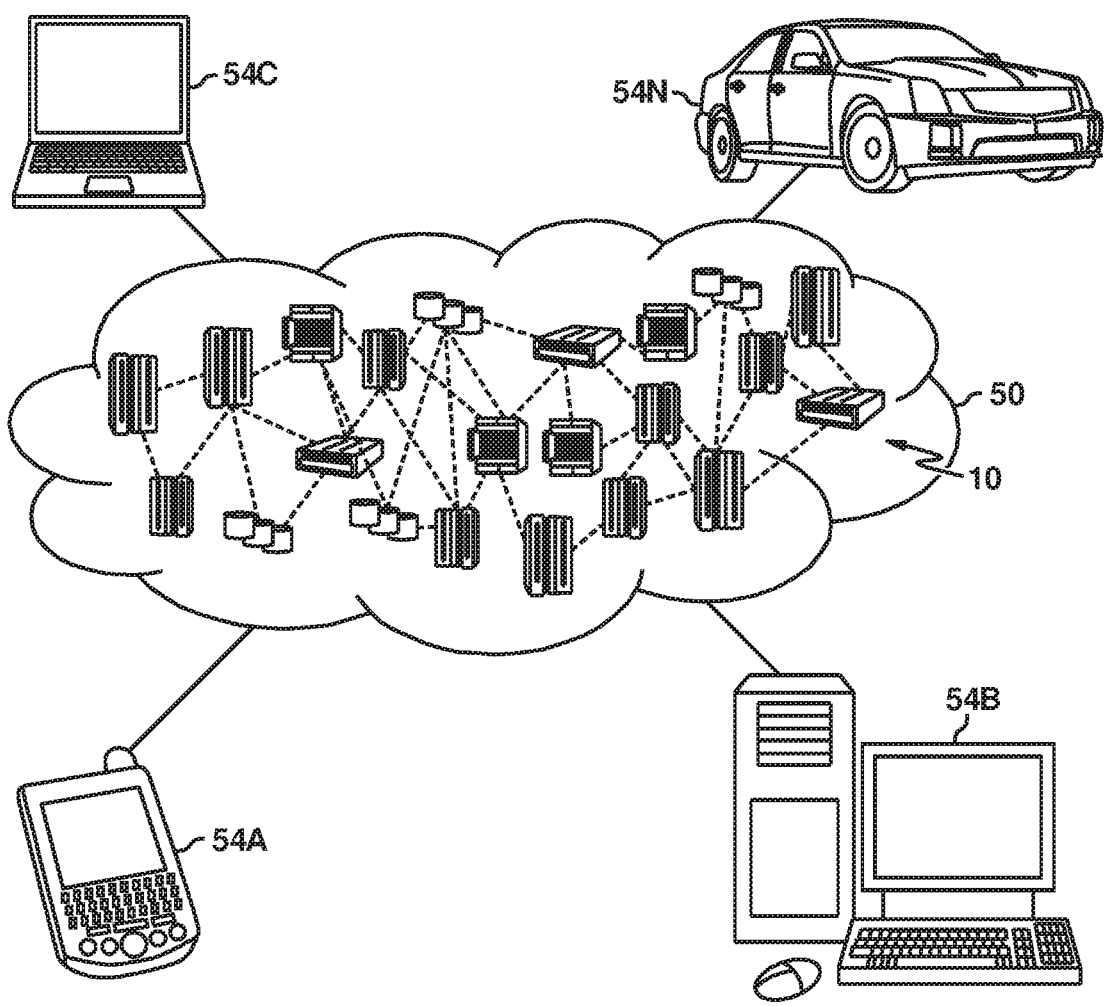
FIG. 5 illustrates a cloud computing environment, in accordance with an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
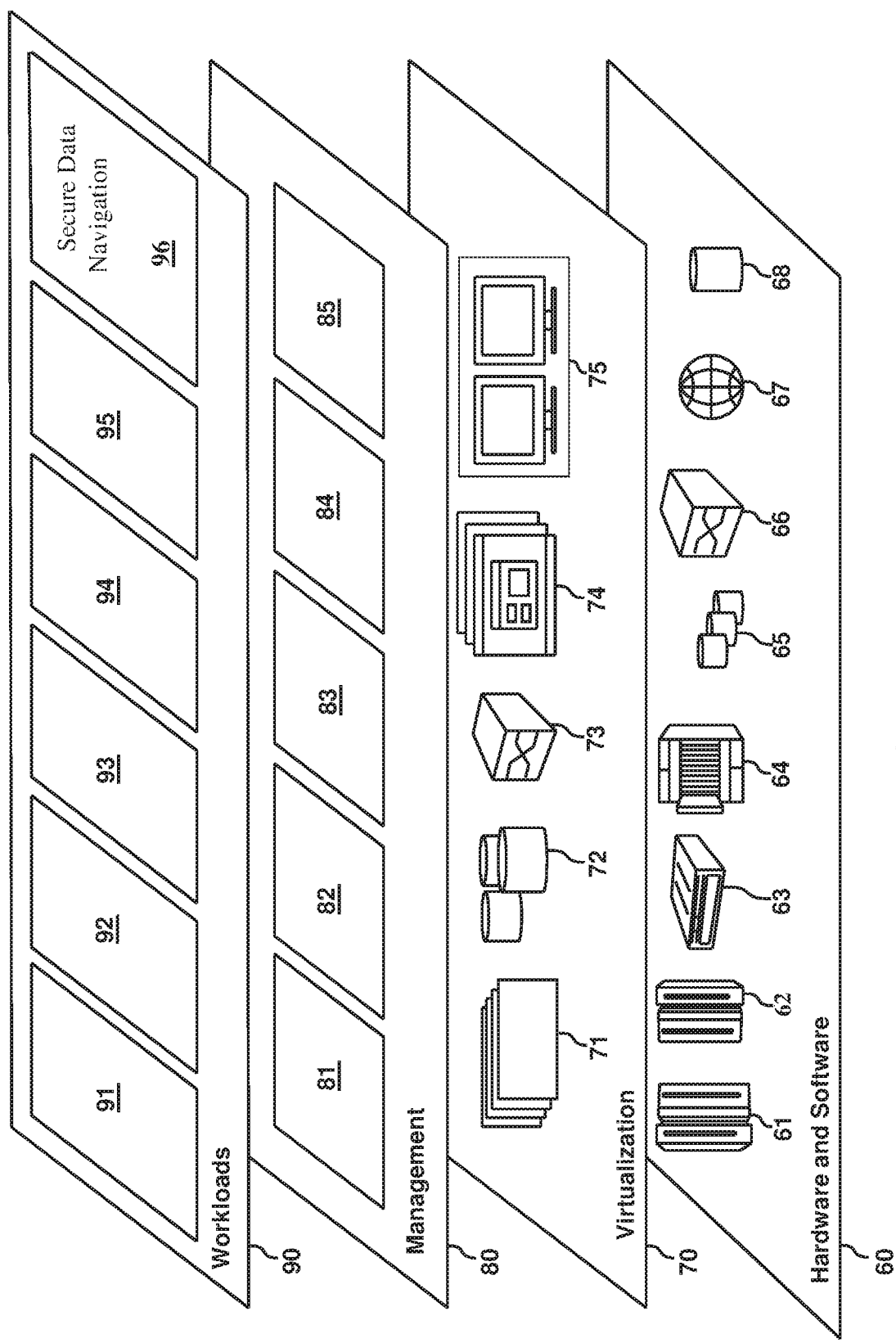
FIG. 6 illustrates a set of functional abstraction layers provided by the cloud computing environment of FIG. 5, in accordance with an embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure data navigation 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited and is merely provided to facilitate clear referencing of the method's steps. Furthermore, steps of the method may be performed in parallel to perform their described functionality.

What is claimed is:

1. A method for secure data navigation, the method comprising:
   receiving, by a computing device, current travel data associated with a primary user traveling on a destination route;
   determining, by the computing device, past travel data associated with the primary user on the destination route;
   calculating, by the computing device, in response to determining that the past travel data associated with the primary user on the destination route exists, a reliability degree of the current travel data associated with the primary user on the destination route based on the past travel data associated with the primary user on the destination route; and
   transmitting, by the computing device, a signal to a user device, the signal providing an instruction to display features of points of interest along the destination route according to one of a plurality of abstraction levels based on the reliability degree,
   wherein each of the plurality of abstraction levels defines which of the features of the points of interest along the destination route are displayed, and different abstraction levels permit the display of different features of the points of interest along the destination route.

2. The method of claim 1, further comprising:
   receiving, by the computing device, in response to determining that no past travel data associated with the primary user on the destination route exists, travel data associated with one or more secondary users on the destination route; and
   calculating, by the computing device, a reliability degree of the current travel data associated with the primary user on the destination route based on the travel data associated with the one or more secondary users on the destination route.

3. The method of claim 1, further comprising:
   receiving, by the computing device, in response to determining that no past travel data associated with the primary user on the destination route exists, map data associated with the destination route; and
   calculating, by the computing device, a reliability degree of the current travel data associated with the primary user on the destination route based on the map data associated with the destination route.

4. The method of claim 3, wherein the map data comprises traffic data for the destination route.

5. The method of claim 3, wherein the map data comprises weather data for the destination route.

6. The method of claim 1, further comprising:

receiving, by the computing device, user preference data, wherein the user preference data contains preferred user points of interest; and transmitting, by the computing device, the signal to the user device, the signal providing an instruction to display the preferred user points of interest along the destination route based on the reliability degree.

7. The method of claim 1, wherein transmitting the signal to the user device, the signal providing the instruction to display the features of the points of interest along the destination route according to the one of the plurality of abstraction levels based on the reliability degree, further comprises:

transmitting, by the computing device, in response to calculating a low reliability degree, the signal to the user device, the signal providing an instruction to display the features of the points of interest along the destination route according to a generic abstraction level.

8. The method of claim 7, wherein the generic abstraction level comprises a category of the points of interest.

9. The method of claim 1, wherein transmitting the signal to the user device, the signal providing the instruction to display the features of the points of interest along the destination route according to the one of the plurality of abstraction levels based on the reliability degree, further comprises:

transmitting, by the computing device, in response to calculating a high reliability degree, the signal to the user device, the signal providing an instruction to display the features of the points of interest along the destination route according to a specific abstraction level.

10. The method of claim 9, wherein the specific abstraction level comprises a name of the points of interest.

11. A computer program product for secure data navigation, the computer program product comprising: a computer-readable storage medium having program instructions embodied therewith, wherein the computer readable storage medium is not a transitory signal per se, the program instructions comprising:

program instructions to receive, by a computing device, current travel data associated with a primary user travelling on a destination route;

program instructions to determine, by the computing device, past travel data associated with the primary user on the destination route;

program instructions to calculate, by the computing device, in response to determining that the past travel data associated with the primary user on the destination route exists, a reliability degree of the current travel data associated with the primary user on the destination route based on the past travel data associated with the primary user on the destination route; and program instructions to transmit, by the computing device, a signal to a user device, the signal providing an instruction to display features of points of interest along the destination route according to one of a plurality of abstraction levels based on the reliability degree, wherein each of the plurality of abstraction levels defines which of the features of the points of interest along the destination route are displayed, and different abstraction levels permit the display of different features of the points of interest along the destination route.

12. The computer program product of claim 11, further comprising:

program instructions to receive, by the computing device, in response to determining that no past travel data associated with the primary user on the destination route exists, travel data associated with one or more secondary users on the destination route; and program instructions to calculate, by the computing device, a reliability degree of the current travel data associated with the primary user on the destination route based on the travel data associated with the one or more secondary users on the destination route.

13. The computer program product of claim 11, further comprising:

program instructions to receive, by the computing device, in response to determining that no past travel data associated with the primary user on the destination route exists, map data associated with the destination route; and program instructions to calculate, by the computing device, a reliability degree of the current travel data associated with the primary user on the destination route based on the map data associated with the destination route.

14. The computer program product of claim 11, further comprising:

program instructions to receive, by the computing device, user preference data, wherein the user preference data contains preferred user points of interest; and program instructions to transmit, by the computing device, the signal to the user device, the signal providing an instruction to display the preferred user points of interest along the destination route based on the reliability degree.

15. The computer program product of claim 11, wherein the program instructions to transmit the signal to the user device, the signal providing the instruction to display the features of the points of interest along the destination route according to the one of the plurality of abstraction levels based on the reliability degree, further comprises:

program instructions to transmit, by the computing device, in response to calculating a low reliability degree, the signal to the user device, the signal providing an instruction to display the features of the points of interest along the destination route according to a generic abstraction level; and program instructions to transmit, by the computing device, in response to calculating a high reliability degree, the signal to the user device, the signal providing an instruction to display the features of the points of interest along the destination route according to a specific abstraction level.

16. A computer system for secure data navigation, the system comprising:

one or more computer processors, one or more computer-readable storage media, and program instructions stored on the one or more computer-readable storage media for execution by at least one of the one or more processors, the program instructions comprising:

program instructions to receive, by a computing device, current travel data associated with a primary user travelling on a destination route;

program instructions to determine, by the computing device, past travel data associated with the primary user on the destination route;

program instructions to calculate, by the computing device, in response to determining that the past travel data associated with the primary user on the destination route exists, a reliability degree of the current travel data associated with the primary user on the destination route based on the past travel data associated with the primary user on the destination route; and program instructions to transmit, by the computing device, a signal to a user device, the signal providing an instruction to display features of points of interest along the destination route according to one of a plurality of abstraction levels based on the reliability degree, wherein each of the plurality of abstraction levels defines which of the features of the points of interest along the destination route are displayed, and different abstraction levels permit the display of different features of the points of interest along the destination route.

17. The computer system of claim 16, further comprising:
program instructions to receive, by the computing device, in response to determining that no past travel data associated with the primary user on the destination route exists, travel data associated with one or more secondary users on the destination route; and
program instructions to calculate, by the computing device, a reliability degree of the current travel data associated with the primary user on the destination route based on the travel data associated with the one or more secondary users on the destination route.

18. The computer system of claim 16, further comprising:
program instructions to receive, by the computing device, in response to determining that no past travel data associated with the primary user on the destination route exists, map data associated with the destination route; and program instructions to calculate, by the computing device, a reliability degree of the current travel data associated with the primary user on the destination route based on the map data associated with the destination route.

19. The computer system of claim 16, further comprising:
program instructions to receive, by the computing device, user preference data, wherein the user preference data contains preferred user points of interest; and
program instructions to transmit, by the computing device, the signal to the user device, the signal providing an instruction to display the preferred user points of interest along the destination route based on the reliability degree.

20. The computer system of claim 16, wherein the program instructions to transmit the signal to the user device, the signal providing the instruction to display the features of the points of interest along the destination route according to the one of the plurality of abstraction levels based on the reliability degree, further comprises:
program instructions to transmit, by the computing device, in response to calculating a low reliability degree, the signal to the user device, the signal providing an instruction to display the features of the points of interest along the destination route according to a generic abstraction level; and
program instructions to transmit, by the computing device, in response to calculating a high reliability degree, the signal to the user device, the signal providing an instruction to display the features of the points of interest along the destination route according to a specific abstraction level.

\* \* \* \* \*